Figure 9:
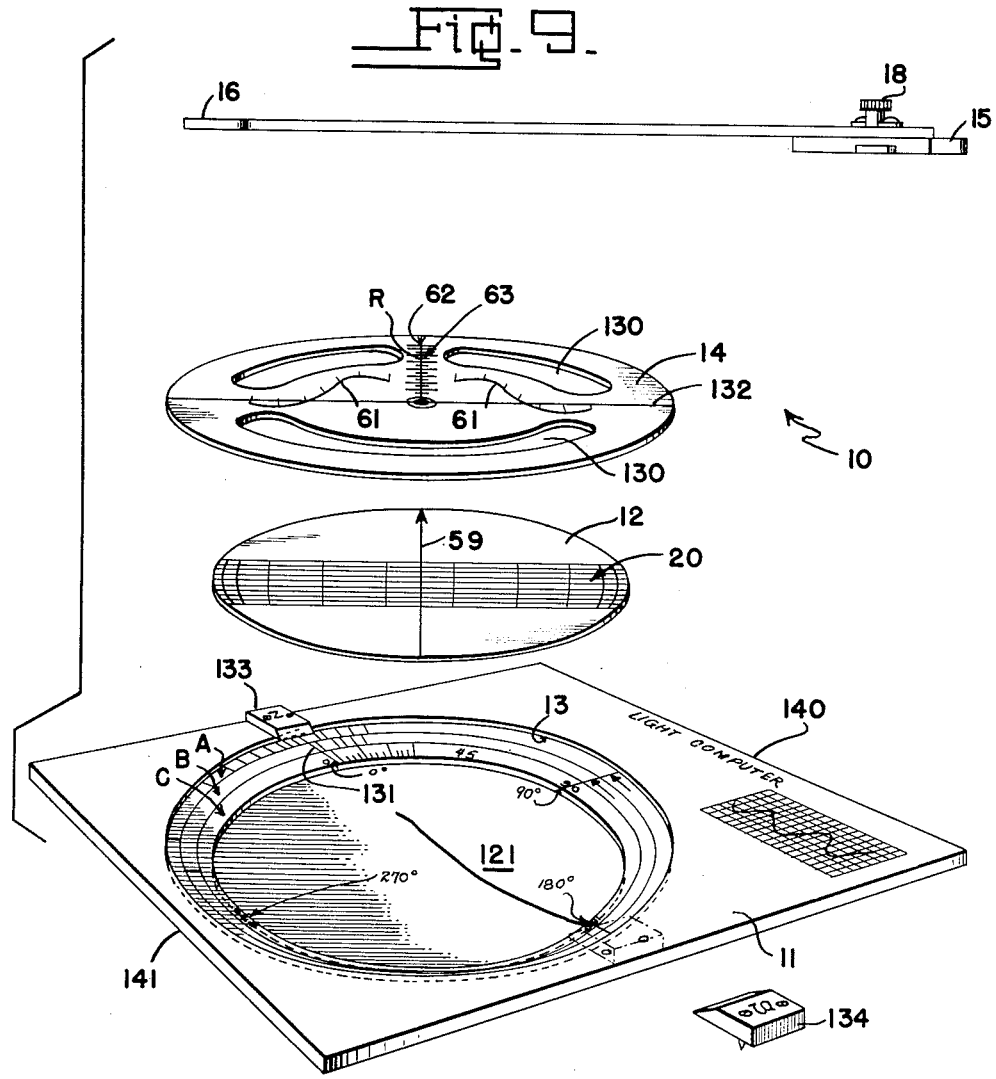

Nov. 28, 1950  D. R. E. BROWN  2,531,932
LIGHT AND SUN POSITION CALCULATOR
Filed Nov. 23, 1949  3 Sheets-Sheet 1
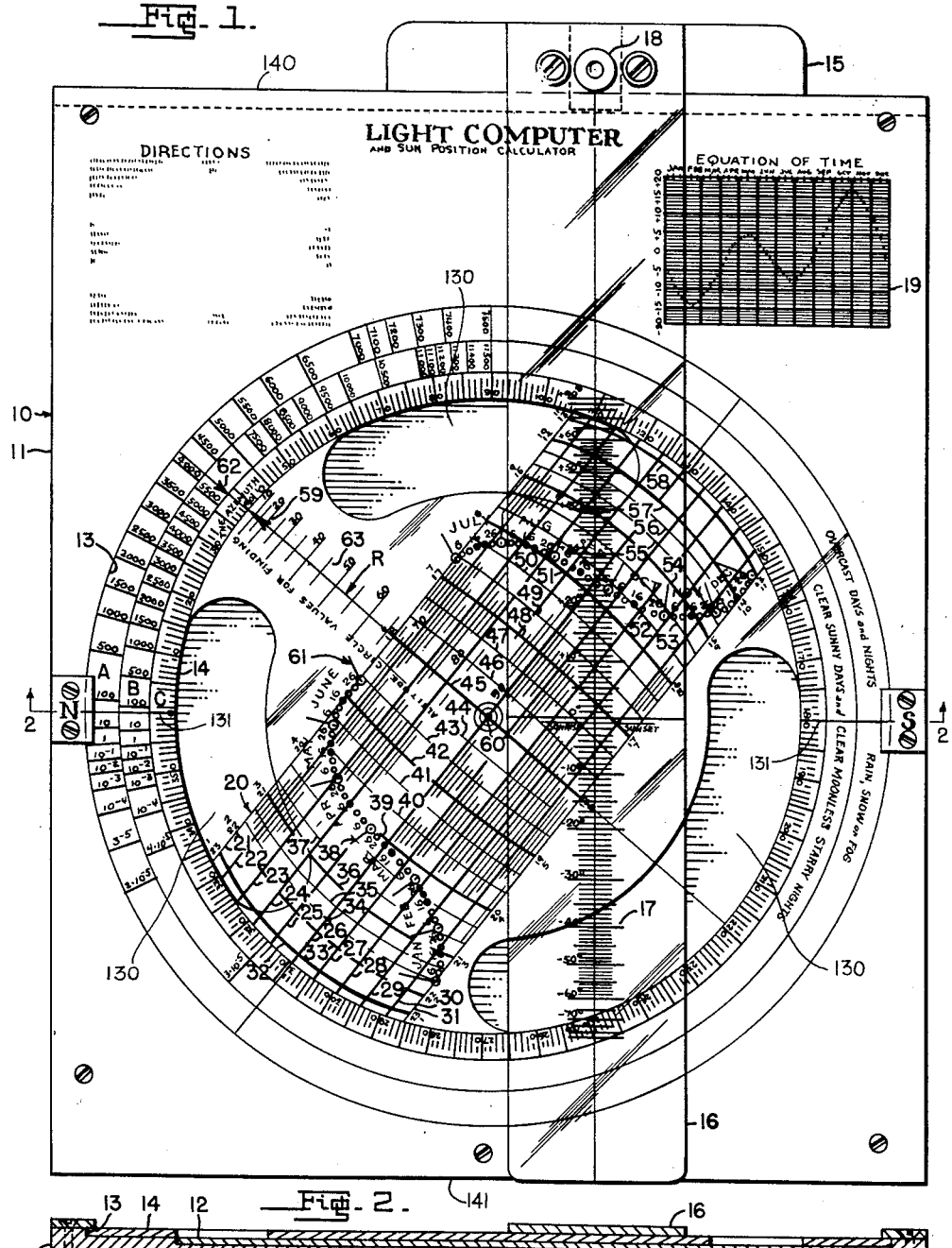
INVENTOR.
Dayton R. E. Brown
BY
ATTORNEY

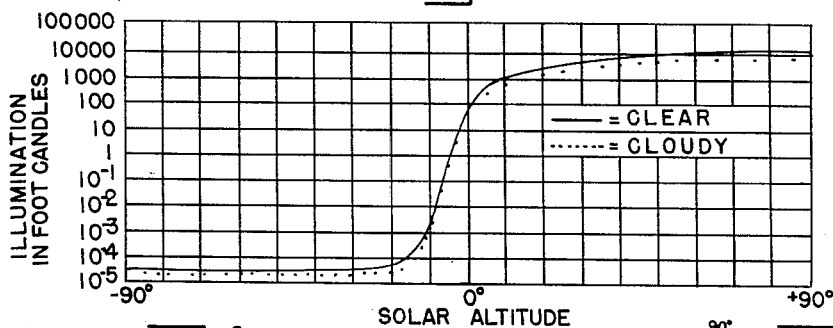
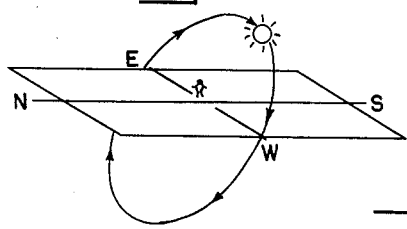
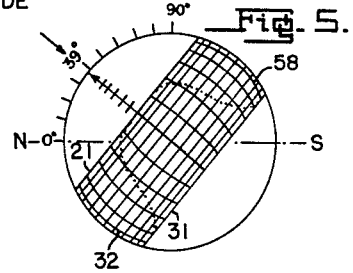
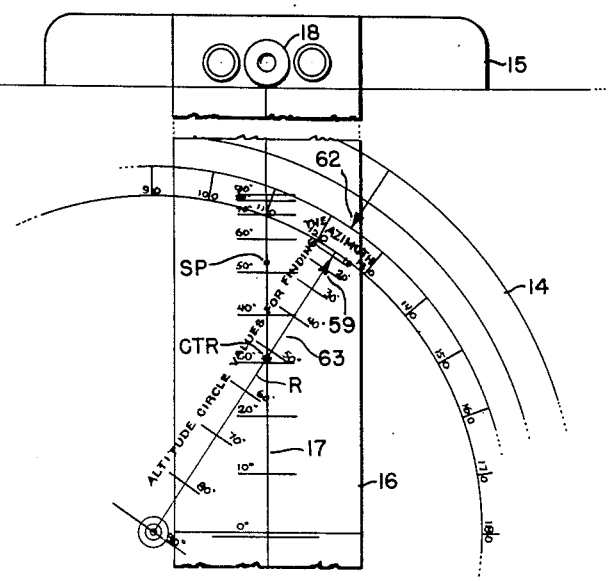
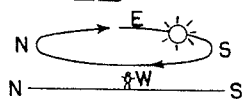
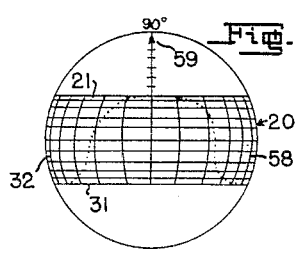

Nov. 28, 1950     D. R. E. BROWN     2,531,932
LIGHT AND SUN POSITION CALCULATOR

Filed Nov. 23, 1949     3 Sheets-Sheet 3

INVENTOR
DAYTON R. E. BROWN

BY
ATTORNEYS

Patented Nov. 28, 1950

2,531,932

UNITED STATES PATENT OFFICE 2,531,932

LIGHT AND SUN POSITION CALCULATOR

Dayton R. E. Brown, Washington, D. C.

Application November 23, 1949, Serial No. 129,162

3 Claims. (Cl. 235—61)

(Granted under the act of March 3, 1883, as amended April 30, 1928; 370 O. G. 757)

The present invention relates to natural light and sun position calculators.

In planning military or naval operations it is often of great importance to know in advance what general illumination will obtain on a given date at a given time and place. Natural illumination has a direct influence on the visibility of objects of military and naval significance. Also the design and construction of manufacturing plants, office buildings, homes and gardens can benefit from a study of the direction of the sun's rays from hour to hour throughout the year.

Many persons concerned with natural light have found it troublesome to obtain nautical almanacs and sets of tables from which the sun's position can be computed. Moreover, solving the astronomical triangle to find the sun's position is difficult to all but a limited few.

An important object of the present invention is to provide an instrument for use in estimating the amount of natural light present at any time, date and place.

Another object of the invention is the provision of an instrument for use in finding the altitude or depression of the sun at any time, date and place.

A further object is to provide an instrument for use in finding the azimuth of the sun at any time, date and place.

The invention also aims to provide an instrument for use in finding the altitude and azimuth of stars whose declinations lie between 23.5° South and 23.5° North.

A further object is the provision of an instrument for use in finding the time of sunrise and sunset at any date and place.

A still further object is to provide an instrument for assisting students of navigational astronomy in visualizing the course of the sun and stars.

Other objects and many of the attendant advantages of this invention will be readily apparent as the same becomes better understood by reference to the following detailed description when considered in connection with the accompanying drawings wherein:

Figure 1 is a top plan view of the computer,

Figure 2 is a vertical cross-sectional view substantially on the line 2—2 of Figure 1, Figure 3 is a graph of natural illumination as a function of solar altitude, Figures 4 and 5 are diagrammatic views illustrating diurnal paths at 39° North Latitude, Figures 6 and 7 are diagrammatic views illustrating diurnal paths at 90° North Latitude, Figure 8 is a fragmentary diagrammatic view illustrating the use of the computer in finding the azimuth.

Figure 9 is an exploded perspective view of the computer.

Recently it was discovered that the entire range of light values reaching the Earth from the sun and sky is only slightly affected by the weather but instead depends almost entirely on the altitude of the sun. This is true not only on clear days and moonless nights but also on average cloudy days and cloudy moonless nights. Thousands of observations were made in widely separated places including the Arctic, the Antarctic, both temperate zones and the Tropics. From measurements obtained, the two curves shown in Figure 3 were constructed giving the values of light for all degrees of altitude and depression of the sun.

The curve shown by continuous line is for clear weather, that shown by dotted line is for average cloudy weather. These curves show that on average clear days a variation in altitude of the sun from the nadir, −90°, to the zenith, +90°, changes the illumination from 0.00003 to 11,500 foot candles, a variation of nearly 4,000,000 percent, whereas the difference in illumination between clear and cloudy weather averages only about 30 percent and seldom reaches 80 percent under extreme conditions of dense cloudiness.

In the drawings which for the purpose of illustration show only a preferred embodiment of the invention, and wherein similar reference characters denote corresponding parts throughout the views, 10 generally designates the computer. As shown in Figures 1 and 2, the computer comprises a rectangular base plate 11 having an upper straight edge 140 parallel to horizon line 131 and circularly recessed to receive a lower rotary disc 12. A like lower straight edge 141 may be provided if desired. Coaxially of the circular recess the base plate 11 is provided with an annular recess 13 receiving an upper rotary transparent disc 14 held by ears 133 and 134 or other suitable means over the disc 12. Disc 12 is operated through apertures 130 in disc 14. Disc 14 is provided with horizon line 132 normal to radius R as shown in Figures 1 and 9.

The annular surface defining the base of the recess 13 carries outer and intermediate semi-circular scales A, B concentric with an inner circular scale C graduated in degrees. Extending diametrically of the degrees scale C is a North-South axis N-S, shown at 131, and marking the horizon at any given place. This axis N-S is indicated at one end by the letter N near the left margin of the computer adjacent the 0° mark of the scale C and at its opposite end by the letter S on the right margin adjacent the 180° mark. Slidable over the base plate 11 is a T-square 15 having a transparent blade 16 carrying a —90° to +90° vertical altitude scale 17 which is a projection of the 0°-180° degree divisions of scale C on a line normal to the North-South axis N-S. The scale 17 is therefore sinusoidally graduated. The head of the T-square may be provided with any suitable clamping device 18 for holding the T-square blade 16 in any set position on the base plate.

The values of illumination in foot-candles for cloudy and clear weather given in Figure 3 are plotted on the semi-circular scales A, B alongside the degrees scale C from 270° to 90° as functions of solar altitude. Hence, when the altitude is known, a corresponding average light value for overcast days and nights and during rain, snow or fog may be read off scale A and for clear, sunny days and clear, moonless, starry nights off scale B whether the sun is above or below the horizon.

Suitable directions for use of the light computer and sun position calculator, and a chart 19 showing the Equation of Time are preferably applied to the base plate 11, as by printing. The Equation of Time chart is used in determining the true sun time (local apparent time) on any particular day when the mean sun time (local means solar time) is known.

Delineated on the rotor disc 12 and visible through the transparent disc 14 is a diurnal grid 20 comprising a series of parallel lines 21-31 and crossing arcs 32-58. The spaces between these parallel lines and crossing arcs may be subdivided by additional lines such as those shown but not numbered in the drawings. The apparent course of the sun along its daily circuit around the Earth is very close to a true circle and is called a diurnal. The sun's average rate of travel along a diurnal path is 15 degrees per hour so that in 24 hours it completes a whole circuit of 360°. The computer is designed to illustrate graphically the course of the sun's travel on a diurnal relative to the horizon, thereby enabling the user to find the altitude of the sun at any time of day or night at any selected place on the Earth's surface. Inasmuch as the North-South axis N-S represents the horizon, West is considered to be in front of the computer and East behind it.

The selected geographical location is represented by the center 60 of the rotary disc 12. To an observer somewhere in the United States the sun appears to rise in the morning above the horizon, as represented by the line N-S in Figure 4, swing around the sky and go below the horizon again at sunset. In order to make solutions possible on the computer, the circular diurnals are simplified by showing them as side view projections forming the series of parallel lines 21-31 depicted in Figure 5.

The diurnal grid 20 may be set for any given latitude by aligning its arrow 59 with the proper latitude indicia on the degrees scale C. If the diurnal grid is set for 90° North Latitude as shown in Figure 7, the top diurnal line 21 represents the apparent path of the sun at the North Pole on June 21. The curved lines 32-58 shown in Figure 1 crossing the diurnal grid divide the diurnals 21-31 into time intervals. Instead of referring to hours as 1-12 a. m. and p. m., the convention of numbering all 24 hours consecutively is followed. Preferably the computer is made of a size to permit subdivision of the hours into smaller intervals. On June 21 the day starts at midnight and the sun's position is then represented by a point at the left end of the top diurnal line. In the morning the sun's hourly progress along its path is marked by the upper figures 1, 2, 3, etc. till noon which is represented by a point at the right end of the diurnal line. Its afternoon progress is marked by the figures 13, 14, 15, etc. Actually then, to a person at the North Pole on June 21 the sun would appear to describe a horizontal circle in the sky 23.5° above the horizon, as illustrated in Figure 6.

On each successive day the path is a trifle nearer the horizon inasmuch as the sun travels slowly downward in a continuous spiral until about September 23 when it begins to disappear below the horizon. This progression from day to day can be followed on a dot calendar 61 which in the present embodiment of the invention is delineated on the top transparent disc 14. Obviously the dot calendar could be delineated directly on the diurnal grid 20 if desired. This dot calendar 61 is used in selecting the proper diurnal or for finding the approximate declination of the sun for any particular day of the year. When the arrow 59 of the diurnal disc 12 and an arrow 62 on the top disc 14 are aligned, the dots of the calendar 61 mark the positions of the diurnal lines on the 1st, 6th, 11th, 16th, 21st, and 26th of each month. About December 21 the sun reaches its lowest point below the horizon and then gradually spirals up again.

The diurnals are practically horizontal at the South Pole as well as at the North Pole, but to an observer at the Equator the apparent path of the sun is up and down along a semicircular arch in a vertical plane. For every degree that a place is distant from the Equator, the plane of each diurnal slopes one degree away from the vertical. The arrow 59 when pointed to a selected degree number above the North-South axis automatically sets all of the diurnals for the North Latitude of that number. Figure 5 shows the diurnal grid set for the latitude of Washington, D. C., which is approximately 39° North. To set the diurnals for 39° South Latitude, it is necessary to point the arrow 39° below the horizon line N-S to the place on the scale C marked 321°.

In the Northern Hemisphere the sun on any given date is farthest South at Noon and farthest North at Midnight, whereas in the Southern Hemisphere the sun is farthest South at Midnight and farthest North at Noon. At the North and South Poles the progression of the diurnals over a year's time is up and down, whereas at the Equator the progression is lateral in a North and South direction. Elsewhere the progression of the diurnals over a year's time is somewhat North and South, that is, the diurnal for June 21 is farthest to the North, for December 21 farthest to the South.

Delineated on the upper transparent disc 14 is an altitude circle scale 63 for use in finding the sun's azimuth. It is a projection of the 0°-90° quadrant of scale C on a rotatable radius R aligning with the arrow 62. Unlike scale 17 however, the graduations of the altitude circle scale 63 projected from the 0°-90° quadrant of scale C are reversely marked 90°–0° respectively. Scale 63 is therefore cosinusoidally graduated. These mark the radii of altitude circles projected on the N–S horizon.

The steps for finding the solar altitude are briefly as follows:

First, the lower and upper discs 12, 14 are rotated until the arrows 59, 62 point to a mark on the degrees scale C corresponding to the latitude of a given place for which the solar altitude is desired.

Second, from the diurnal lines 21–31 on the lower disc 12 one line is selected which appears to intersect the dot marking the date on the upper transparent disc 14.

Third, the position of the sun along its diurnal path at the given time is found by locating the point of intersection of the proper one of the time lines 32–58 with the previously selected diurnal line.

Fourth, the altitude of the sun's position above the horizon is found by reference to the vertical altitude scale 17 which measures the angular distance between the axis N–S representing the horizon, and the previously located intersection point representing the sun's position.

Corrections for Longitude and for differences between clock time, mean solar time and true solar time are made in the usual way.

The following problems illustrate the operation of the device:

PROBLEM 1

Find the altitude of the sun and the amount of natural illuminaton on a clear day at Washington, D. C., at 10:00 Eastern Standard Time on the 16th of August. Washington, D. C.=Latitude 39° North, Longitude 77° West.

Rough solution

1. Set both disc arrows 59, 62, to 39° on scale C, as shown in Figure 1.
2. Find 10:00 Eastern Standard Time on the diurnal for August 16.

NOTE.—The diurnal for August 16 starts at the mark 323° on scale C, passes directly under the dot for August 16, and reaches the mark 115° on scale C at Noon. The sun's position at 10:00 is where the 10th hour curve 10—10 crosses the diurnal for August 16.

3. Measure the altitude for 10:00 with the T-square altitude scale 17.

Answer

Altitude=53½°.

Illumination=8500 foot-candles. This quantity is read off scale B adjacent the 53½° mark on scale C.

In the foregoing rough solution, Eastern Standard Time was used. The Mean Solar Time at any given instant at a given place differs from Zone Standard Time by an amount directly proportional to the distance that that place is Eastward or Westward from the Zone Meridian. For each degree of Longitude a place is East of the Zone Meridian the Mean Solar Time is 4 minutes faster than the clock. For each degree a place is West of the Zone Meridian the Mean Solar Time is 4 minutes slower than the clock. For a more accurate solution, a correction of time for longitude is therefore necessary.

Mean Solar Time is measured by the regular motion of an imaginary sun since the motion of the real sun is not regular. The real sun gets behind and again ahead of its average schedule by as much as 16 minutes. This difference is shown in the Equation of Time chart. A more accurate solution therefore requires a correction for the difference between Mean Solar Time and True Solar Time.

Problem 1.—More accurate solution

1. Correct Eastern Standard Time to Mean Solar Time at Washington, D. C.

77° West=Longitude of Washington, D. C.
75° West=Longitude of Eastern Standard Time Zone Meridian
2° West=Difference
4 minutes=Time difference per degree
8 minutes=Correction
10:00=Eastern Standard Time
−:08=Correction
09:52=Mean Solar Time at Washington, D. C.

2. Correct Mean Solar Time to True Solar Time for August 16.

09:52=Mean Solar Time
−:04.3=Equation of Time correction for August 16
09:47.7=True Solar Time 3. Set the arrows 59, 62 of both discs to 39° on scale C.
4. Select the diurnal for August 16 and locate the sun's position for 09:47.7 on the diurnal.
5. Measure the solar altitude with the T-square altitude scale 17.

Answer

Altitude=51½°.
Illumination=8175 foot-candles.

PROBLEM 2

Find the azimuth of the sun at 10:00 Eastern Standard Time on August 16 at Washington, D. C.

Solution

Azimuth is the angular distance around the Horizon from some starting point, generally North. The Azimuth is measured in degrees generally starting with North as 0° and going in the direction North, East, South, West. This is the convention used in the U. S. Navy.

1. Find the sun's position on the diurnal line as in the latter solution of Problem 1. This is point SP in Figure 8.
2. Set the center line of the T-square scale 17 directly over this sun position and secure the T-square in place, as by clamping screw 18, as shown in Figure 8.
3. Make a note of the solar altitude as 51½° and then rotate the diurnal grid disc 12 to enable an easier reading if the grid indicia interferes.
4. Rotate the transparent upper disc 14 until the center of the 51½° mark on the altitude circle scale 63 crosses the vertical center line of the T-square scale 17. This center is point CTR in Figure 8.
5. Read the Azimuth on scale C under the top disc arrow head 62 below the word "Azimuth."

Answer=122°.

NOTE.—The foregoing explanation permits one of two answers for Azimuth, one occurring before and one after noon for the same setting of the vertical T-square scale 17. Care should be taken, especially for the Tropics and for South Latitudes also to note which is the logical answer.

PROBLEM 3

Find the Eastern Standard Time of Sunrise and Sunset for August 16 at Washington, D. C.

Solution

1. Set the upper and lower disc arrows 59, 62 to 39° as in Problems 1 and 2.
2. Slide the T-square blade 16 over to where the line marked Sunrise-Sunset crosses the diurnal for August 16.
3. Read on the diurnal:

Sunrise=05:09 Mean Solar Time
Sunset=18:51 Mean Solar Time

4. Convert Mean Solar Time to Eastern Standard Time and also correct for the Longitude of Washington, D. C.

Sunrise=05:09 Mean Solar Time
+8 for Longitude correction
+4.3 for Equation of Time correction
Sunrise=05:21.3 Eastern Standard Time
Sunset=18:51 Mean Standard Time
+8 for Longitude correction
+4.3 for Equation of Time correction
Sunset=19:03.3 Eastern Standard Time Various modifications may be made in the form of invention herein shown and described without departing from the spirit of the invention or the scope of the following claims.

The invention described herein may be manufactured and used by or for the Government of the United States of America for governmental purposes without the payment of any royalties thereon or therefor.

I claim:

1. A computer, comprising: a flat base; a lower circular recess in the upper surface of said base having a first diameter; a concentric upper recess in said surface having a greater diameter; a flat annular band intermediate the circumferences of said recesses; a horizontal diameter line across the center of said band; a horizontal straight edge at the top of said surface; a T-square member slidable on said edge and having on its blade a transparent altitude scale vertical to said diameter; said band having thereon a clear-sky light scale, an overcast-sky light scale and a circular latitude scale; a lower disc rotatable in said lower recess and having a diurnal grid thereon, said grid having a vertical transverse axis; an upper transparent disc rotatable in said upper recess and having marked thereon a diameter and a radius vertical to said diameter; said radius having an altitude circle value scale thereon; said upper disc having apertures therein for manually rotating said lower member therethrough; said upper member having date scales thereon positioned to overlie said grid, whereby said members may be selectively positioned to determine the altitude and azimuth of the sun and the natural illumination on any given place at any time.

2. A computer comprising a base; a flat annular surface; a lower disc rotatable in registration with the inner periphery of said annular surface; a transparent upper disc rotatable concentrically with said lower disc and dimensioned to overlie said surface and said lower disc; a horizontal diameter line across said surface; said base having a horizontal straight edge; a T-square member having its head slidable on said edge and having a transparent altitude scale on its blade vertical to said horizontal line; latitude and illumination scales on said surface; a diurnal grid on said lower disc; said grid having a transverse axis line vertical to said grid; a diameter line on said upper disc and a radius line normal thereto; an altitude circle value scale on said radius; date scales on said upper disc positioned to overlie said grid, whereby said discs may be rotated and said blade positioned thereover to positions from which the altitude and azimuth of the sun and the natural illumination on any given place at any time may be read from said positions.

3. In a computer; a flat base; a circular 360° latitude scale thereon having a 0° to 180° axis line representing the horizon; an adjacent scale for clear sky illumination and an adjacent scale for overcast-sky illumination concentric with and graduated in relation to said latitude scale; each of said illumination scales extending above and below said horizon line; a first rotatable disc adjacent to and concentric with said latitude scale; said first disc having a horizontal diurnal grid concentric with said latitude scale; said grid having thereon a vertical transverse axis line and arcuate lines indicating hour graduations; a second transparent disc concentric with and overlying said scales and said first disc; said second disc having marked thereon a center point representing the operator's location and a diameter and a radius vertical to said diameter; said radius having thereon an altitude circle scale graduated in relation to said latitude scale; a date scale on said second disc graduated in relation to said grid and positioned to overlie said grid; a transparent scale vertical to said horizon line and arranged for slidable movement horizontal to said horizon line; said slidable scale having at its midpoint a sunrise and sunset line adapted to be coincident with said horizon line; said slidable transparent vertical scale being graduated above said horizon line in 0° to +90° and below said horizon line in 0° to −90° in relationship to said latitude scale, whereby the illumination naturally falling upon any place at any time of day or night may be determined by selectively positioning said discs and said slidable scale.

DAYTON R. E. BROWN.

REFERENCES CITED

The following references are of record in the file of this patent:

UNITED STATES PATENTS

| Number | Name | Date |
|---|---|---|
| 780,178 | Henning | Jan. 17, 1905 |
| 910,230 | Pratt | Jan. 19, 1909 |
| 990,764 | Morse | Apr. 25, 1911 |
| 1,742,781 | Ott | Jan. 7, 1930 |
| 2,495,777 | Schroeder | Jan. 31, 1950 |

FOREIGN PATENTS

| Number | Country | Date |
|---|---|---|
| 156,033 | Great Britain | Jan. 6, 1921 |